May 31, 1949.  G. E. BURCHER, JR  2,471,558
CARRIAGE
Filed Nov. 14, 1945  2 Sheets-Sheet 1
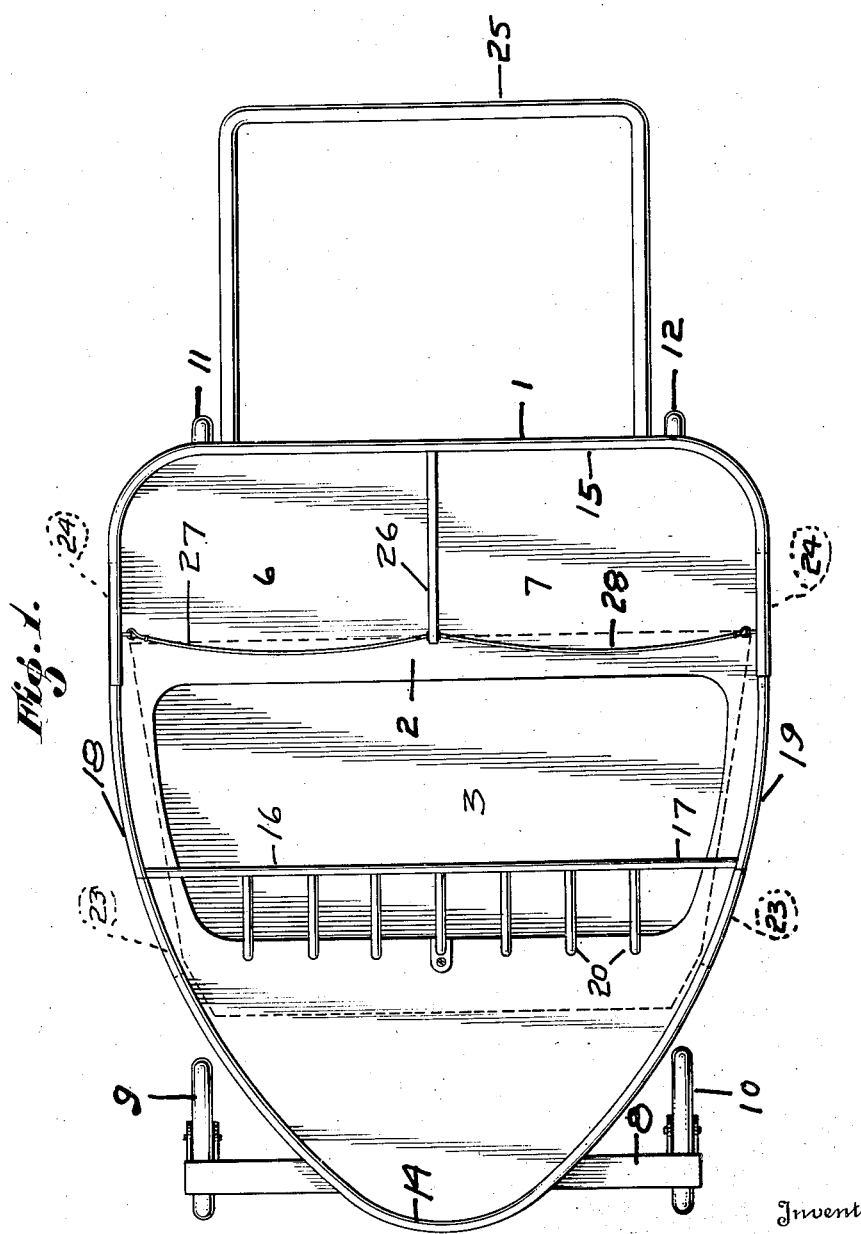
Inventor
GEORGE EDWARD BURCHER, JR.
By Houston Britt
Attorney May 31, 1949.  G. E. BURCHER, JR  2,471,558
CARRIAGE
Filed Nov. 14, 1945  2 Sheets-Sheet 2
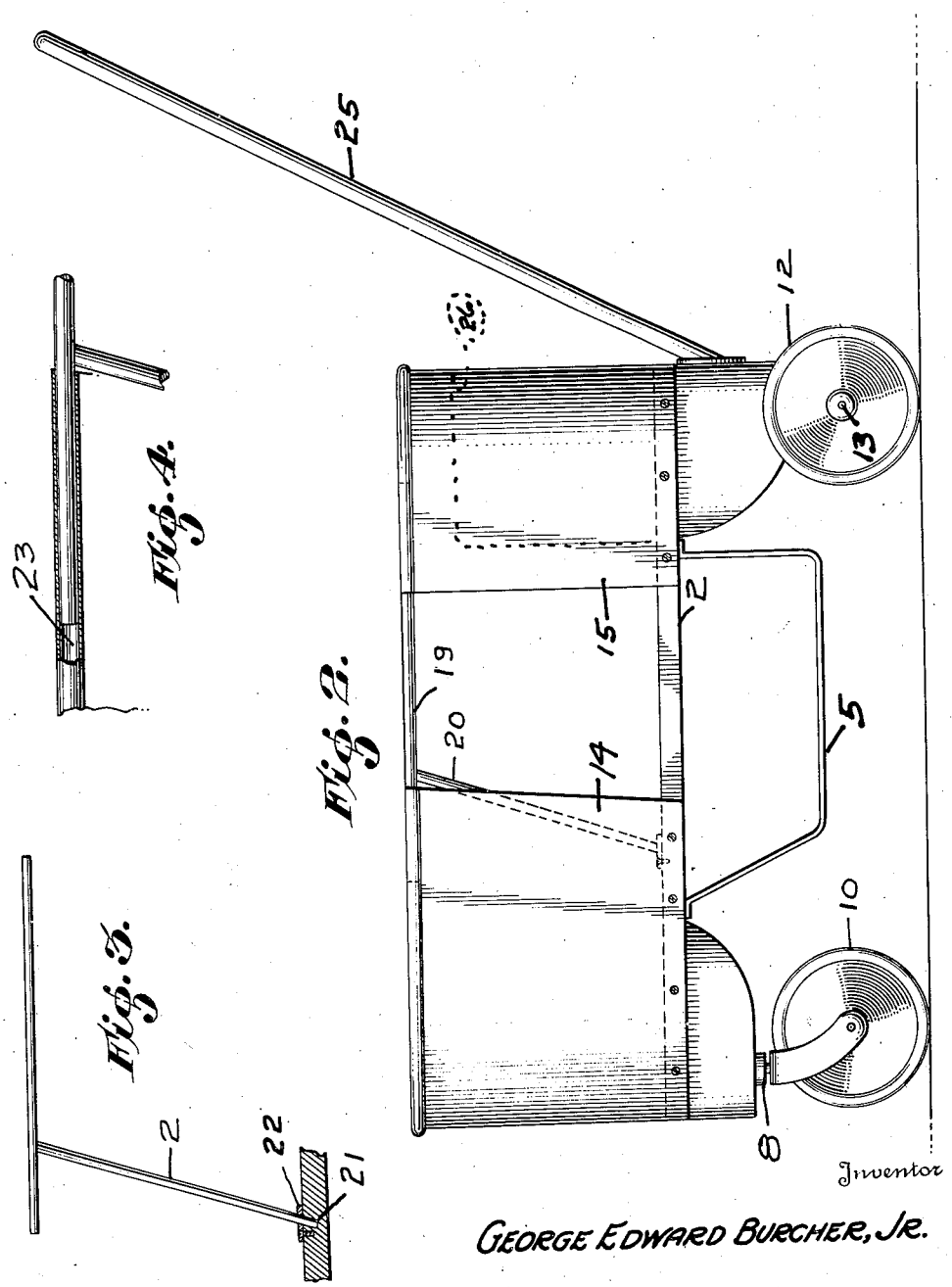
Inventor
GEORGE EDWARD BURCHER, JR.
By
Attorney Patented May 31, 1949

2,471,558

UNITED STATES PATENT OFFICE 2,471,558

CARRIAGE

George Edward Burcher, Jr., Newport News, Va.

Application November 14, 1945, Serial No. 628,553

1 Claim. (Cl. 296—37)

This invention relates to carriages and more particularly to improvements in the type adapted for use in transporting infants.

One of the objects of this invention is the provision of a carriage, provided with a storage compartment and a seat compartment.

Another object of this invention is the provision of a carriage having a grill for dividing a carriage into two compartments as well as being adapted for use as a hand rail and vehicle body support.

Other objects and features will more fully appear from the following description and accompanying drawings in which:

Fig. 1 is a top plan view of the carriage; Fig. 2 a side view; Fig. 3 a side view of the grill; and Fig. 4 a sectional view of the grill in connection with the carriage.

Referring to the drawings, a carriage 1 comprises a floor 2 having an aperture 3 therein. Secured to the underside of said floor in spaced relation from and beneath said aperture is a foot rest 5 which forms the base of a well into which an infant's feet may depend and rest while said infant is disposed upon a seat 6 or 7.

An axle 8 is secured to the front portion of the floor and has pivotally connected thereto wheels 9—10, and wheels 11—12 are respectively connected to an axle 13 secured to the underside rear portion of the floor.

A front wall 14 is secured to the floor and spaced therefrom is a rear wall 15 likewise secured as clearly shown in Fig. 2.

A grill 16 consists of a bar 17 having respectively connected at each of its ends side rails 18—19. Spokes or rods 20 depend from said bar and are adapted to fit and rest in slots 21 in said floor. One of the spokes is provided with a bracket 22 which is adapted to be secured to the floor and thereby prevent removal of the grill as clearly shown in Fig. 3.

The front ends of side rails 18—19 are respectively disposed in channels 23 of the front wall; while the rear ends of side rails 18—19 are respectively disposed in channels 24 of the rear wall.

A handle 25 is secured to the rear of the carriage.

A seat divider 26 is secured to the rear wall and floor portions and thereby divides the seat into two compartments. Safety belts 27—28 are affixed to said divider and connected to sides of said rear wall as clearly illustrated in Fig. 1.

It is obvious from the foregoing that a carriage of the type described is provided with a storage compartment, two seats, a hand rail and well for foot rest, and the grill assembly not only divides the carriage into compartments, but acts as a hand rail and support for the wall structure.

Having described this invention, what is claimed is:

In a carriage of the character described, comprising a storage compartment and a seat compartment, a vehicle body having a floor composed of a front section and a rear section with an aperture therebetween, a foot rest beneath said aperture secured to the underside of said floor, a front wall rigidly secured to the front floor section, and a rear wall rigidly secured to the rear floor section, said front wall having an upright front portion and side portions extending rearwardly therefrom, said rear wall having an upright rear portion and side portions extending forwardly therefrom and spaced from the side portions of the front wall, in the vicinity of the rear portion of the said foot rest, a grill assembly disposed between and secured to the rear portions of the said side portions of the front wall, thereby forming the storage compartment of the carriage, and a seat member disposed between and secured to the said side portions of the rear wall, thereby forming the seat compartment of the carriage.

GEORGE EDWARD BURCHER, JR.

REFERENCES CITED

The following references are of record in the file of this patent:

UNITED STATES PATENTS

| Number | Name | Date |
|---|---|---|
| D. 138,468 | Call | Aug. 8, 1944 |
| 611,937 | Pryor | Oct. 4, 1898 |
| 1,256,379 | Schaefer | Feb. 12, 1918 |
| 1,460,944 | Cameron | July 3, 1923 |
| 1,570,410 | Strauss | Jan. 19, 1926 |
| 1,707,186 | Chatfield | Mar. 26, 1929 |
| 1,842,159 | Fleishman et al. | Jan. 19, 1932 |

FOREIGN PATENTS

| Number | Country | Date |
|---|---|---|
| 11,889 | Great Britain | July 26, 1889 |